United States Patent [19]

Connell et al.

[11] Patent Number: 4,603,035
[45] Date of Patent: Jul. 29, 1986

[54] HYDROGEN SULFIDE REMOVAL PROCESS

[75] Inventors: David E. Connell, El Sobrante; Colin M. Chapman, Rodeo, both of Calif.

[73] Assignee: Chevron Research Company, San Francisco, Calif.

[21] Appl. No.: 537,858

[22] Filed: Sep. 30, 1983

[51] Int. Cl.⁴ .................. C01B 17/16; C01B 17/02
[52] U.S. Cl. ................... 423/226; 423/575; 261/DIG. 54
[58] Field of Search ............ 423/226, 224, 575; 261/DIG. 54

[56] References Cited

U.S. PATENT DOCUMENTS

| | | | |
|---|---|---|---|
| 818,891 | 4/1906 | Jones et al. | 165/113 |
| 2,060,166 | 11/1936 | Bowen | 261/118 |
| 2,259,031 | 10/1941 | Fisher | 261/21 |
| 2,972,393 | 2/1961 | Bush | 55/82 |
| 2,997,439 | 8/1961 | Nicklin et al. | 208/231 |
| 3,009,687 | 11/1961 | Hendriks | 261/16 |
| 3,035,889 | 5/1962 | Nicklin et al. | 423/437 |
| 3,097,926 | 7/1963 | Nicklin et al. | 423/573 R |
| 3,456,928 | 7/1969 | Selway | 261/22 |
| 3,696,590 | 10/1972 | Richmond | 261/DIG. 54 |
| 3,761,066 | 9/1973 | Wheeler | 261/DIG. 7 |
| 3,767,174 | 10/1973 | Heeney | 261/DIG. 54 |
| 3,782,080 | 1/1974 | Gallagher | 261/DIG. 54 |
| 3,894,853 | 7/1975 | Pike | 261/DIG. 54 |
| 3,993,448 | 11/1976 | Lowery | 261/DIG. 9 |
| 4,058,378 | 11/1977 | Saxton | 261/DIG. 54 |
| 4,125,597 | 11/1978 | Fleck | 423/573 R |
| 4,140,501 | 2/1979 | Ekman | 261/DIG. 54 |
| 4,145,193 | 3/1979 | Hegemann | 261/DIG. 56 |
| 4,149,901 | 4/1979 | Morales | 261/108 |
| 4,393,037 | 7/1983 | Delaney et al. | 423/226 |
| 4,425,317 | 1/1984 | Zeller et al. | 423/226 |
| 4,483,843 | 11/1984 | Sonoda et al. | 423/226 |
| 4,511,544 | 4/1985 | Connell et al. | 423/226 |

OTHER PUBLICATIONS

Beavon et al., "Beavon Sulfur Removal Process for Claus Plant Tail Gas", pp. 93–99.

Primary Examiner—T. Tung
Attorney, Agent, or Firm—Burns, Doane, Swecker & Mathis

[57] ABSTRACT

A Stretford process for removing hydrogen sulfide from a high volumetric flow gas stream includes devices for introducing transverse momentum components in a multiphase flow. These momentum components enhance gas/liquid contact and improve the efficiency of hydrogen sulfide removal. Various devices for introducing the momentum components are disclosed including baffle trays, static mixer and tertiary spray devices.

9 Claims, 6 Drawing Figures

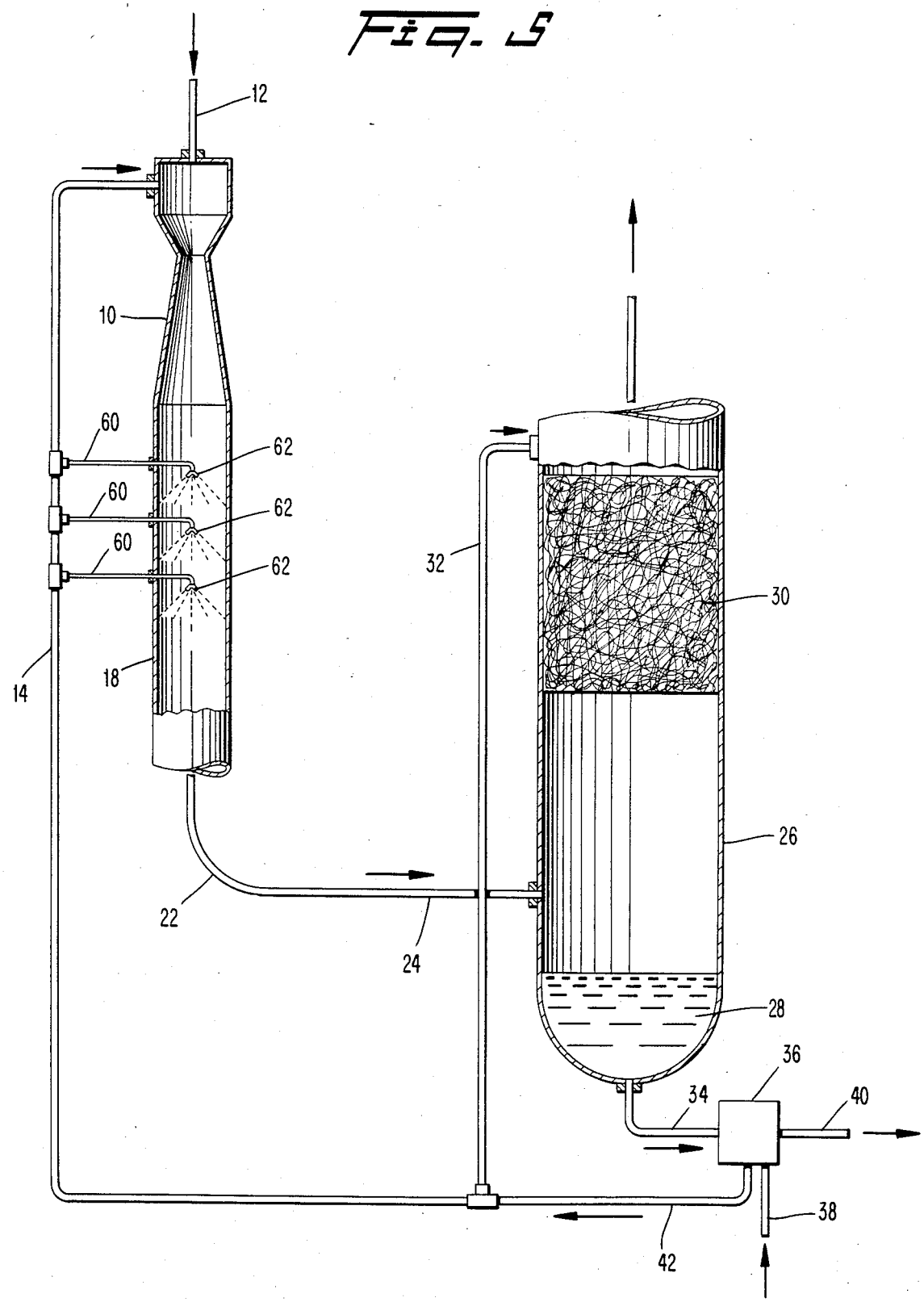

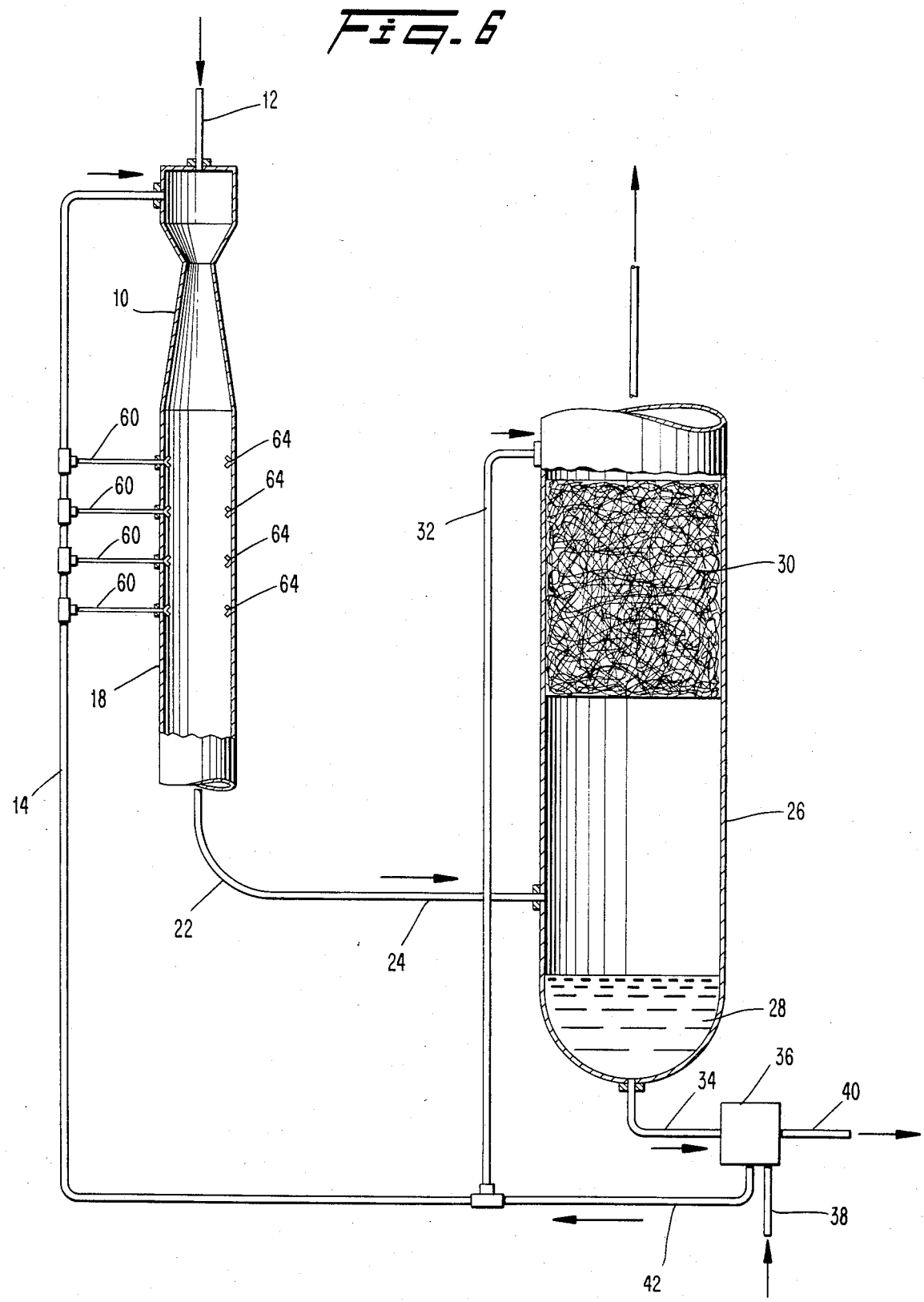

HYDROGEN SULFIDE REMOVAL PROCESS

BACKGROUND OF THE INVENTION

The present invention relates generally to the Stretford process for removing hydrogen sulfide from a gas stream and recovering elemental sulfur as a by-product. More particularly, the present invention concerns an improvement to the gas liquid contacting step by which the Stretford solution is exposed to the gas stream for reaction with the hydrogen sulfide constituent.

Hydrogen sulfide is a noxious gas commonly found in considerable concentrations in sour natural gas and in tail gases from petroleum refineries. The noxiousness of hydrogen sulfide is manifested in a number of ways. For example, an offensive odor is detectable when hydrogen sulfide is present in quantities as low as 0.13 ppm by volume. In addition, a mixture of hydrogen sulfide is present in concentrations as low as 4.4 volume percent. Moreover, hydrogen sulfide is a dangerous mammalian poison.

The noxious character of hydrogen sulfide has led to state and federal laws and regulations that severely restrict the quantities of hydrogen sulfide which may be permissibly exhausted into the atmosphere. In at least partial response to these regulations, numerous processes have been developed to remove hydrogen sulfide from residue gases as well as from otherwise useful products such as natural gas. One of the prominent processes in the petroleum industry for effecting the hydrogen sulfide removal is known as the Stretford process. The Stretford process is generally described in three United States patents issued to T. Nicklin et al, U.S. Pat. No. 2,997,439 issued Aug. 21, 1961; U.S. Pat. No. 3,035,889 issued May 22, 1962; and U.S. Pat. No. 3,097,926 issued July 16, 1963.

According to the Stretford process, gaseous hydrogen sulfide reacts with a solution containing anthraquinone disulphonic acid and an aqueous alkaline solution containing ortho-, meta- and pyro- vanadates of ammonia and alkali metals and a salt of iron, copper, manganese, chromium, nickel, or cobalt. The gaseous hydrogen sulfide, which may be only one constituent of a mixture of gases, is then exposed to the Stretford solution where the reaction occurs. In the reaction, hydrogen sulfide is oxidized by the Stretford solution to elemental sulfur and the solution is reduced. Then air, or an oxygen containing gas, bubbles through the reduced Stretford solution to regenerate that solution by oxidizing it. Subsequently or simultaneously, the sulfur is separated from the Stretford solution and the solution is recirculated in the process. Regeneration of the Stretford solution and separation of elemental sulfur from the Stretford solution typically take place within a flotation cell.

In the typical Stretford process apparatus, the gas/liquid contacting step occurs in a scrubber having a venturi section. As the gas stream containing hydrogen sulfide passes through the venturi, the Stretford solution is sprayed into the gas stream in the form of fine droplets. The chemical reaction discussed above occurs across the surface area of these droplets as they flow downstream along with the gas flow. Generally, gas/liquid contact occurs in a coflowing relationship. Thus, a multiphase flow of gas/liquid and solid particles leaves the venturi discharge.

In conventional Stretford process systems, the multiphase flow from the venturi passes through a conduit that turns the flow to a generally horizontal direction and discharges the flow into the bottom of an absorbing column. The liquid and solid portions of the multiphase flow are generally separated by centrifugal force, as well as by gravity, as the gas stream turns to move vertically upwardly through the absorber column. A second gas/liquid contact step occurs in the absorbing column where additional Stretford solution passes in counterflow relationship with the gas stream and drops to the bottom of the absorbing column.

It is preferred that the primary gas/liquid contact (and sulfur removal) occur upstream of the absorber column. This result is desirable because the small passages of the absorber column become clogged if large quantities of elemental sulfur accumulate therein. Moreover, the large open venturi discharge conduit does not clog when large quantities of the sulfur pass therethrough. Generally speaking, as much as 95–98% of the sulfur should be removed from the gas before it enters the bottom of the absorbing column.

When the Stretford process is scaled up for large volumetric throughflows, the venturi throat diameter may be 24" or greater (i.e. a large venturi). Moreover, it has been observed that inadequate gas/liquid contact occurs in the venturi section. In these large venturis, as little as 65% of the desired sulfur removal occurs.

In general, various kinds of scrubbing devices are known to the art for removing material from a gas stream by use of a liquid. In one such scrubber, a waste gas is contacted with a liquid as the gas passes through a venturi. Downstream of the venturi, the gas and liquid pass through a vertical conduit having twisted helical plates therein. U.S. Pat. No. 3,767,174 issued Oct. 23, 1973 to Heeney. Simple helical vanes at the end of a converging channel have also been used in gas scrubbers. U.S. Pat. No. 818,891 issued Apr. 24, 1906 to Jones et al.

In another scrubber, liquid is sprayed into a gas stream as the gas stream passes through a plurality of parallel venturi channels. After a considerable flow area enlargement, the gas stream and entrained liquid passes through a series of zigzag vanes which separate the liquid from the gas stream. U.S. Pat. No. 4,140,501 issued Feb. 20, 1979 to Ekman. Downwardly sloped deflector plates in a vertical chamber are also known for the purpose of ensuring intimate gas-liquid contact for gas scrubbing. U.S. Pat. No. 3,993,448 issued Nov. 23, 1976 to Lowery, Sr.

Vertically stacked baffle plates have been used in counterflow dust collectors. U.S. Pat. No. 2,259,031 issued Oct. 14, 1941 to Fisher. Vertically stacked arrangements of disc and donut plates are sometimes used to prevent entrained liquid from flowing upwardly with a gas moving through a scrubber, U.S. Pat. No. 3,696,590 issued Oct. 10, 1972 to Richmond, and to promote heat transfer in counterflowing gas and liquid in a scrubber, U.S. Pat. No. 4,149,901 issued Apr. 17, 1979 to Morales. Vertically stacked liquid sprays are also known for cooling a counterflowing gas and removing a crystalline precipitant. U.S. Pat. No. 2,972,393 issued Feb. 21, 1961 to Bush.

Other prior art gas/liquid contact devices are illustrated by the following patents: U.S. Pat. No. 3,782,080 issued Jan. 1, 1974 to Gallagher; U.S. Pat. No. 2,060,166 issued Nov. 10, 1936 to Bowen; U.S. Pat. No. 4,058,378 issued Nov. 15, 1977 to Saxton; U.S. Pat. No. 3,456,928 issued July 22, 1969 to Selway; U.S. Pat. No. 3,894,853 issued July 15, 1975 to Pike; U.S. Pat. No. 3,761,066 issued Sept. 25, 1973 to Wheeler; U.S. Pat. No. 4,145,193 issued Mar. 20, 1979 to Hegemann; and U.S. Pat. No. 3,009,687 issued Nov. 21, 1961 to Hendriks.

Generally, the known contacting devices utilize a column having a large volume so that gas velocities are low while liquid velocities are high. But, the gas velocities at the discharge from a venturi are high by comparison. As a result, most such devices are not suitable for attachment to the discharge of a venturi section. Even where a contacting device is downstream of a venturi (see the Heeney patent), there is no suggestion of using the device in a Stretford process.

It is clear that the need continues to exist for an improvement to the Stretford process which overcomes problems of the type discussed above.

SUMMARY OF THE INVENTION

The improvement to the Stretford process in accordance with the present invention introduces transverse momentum components in the multiphase fluid flow as it leaves the downstream end of the scrubbing device. The transverse momentum components are induced in the downstream conduit and cause the gas flow passing through the conduit to experience a flow path that is longer than the straightline distance through the conduit. Accordingly, the gas stream has greater opportunity for contact with the Stretford solution to effect hydrogen sulfide removal. Another advantage of the transverse momentum components is that the gas and liquid phases of the multiphase flow tend to be more turbulently mixed with one another further enhancing the gas-liquid contact.

In some embodiments, transverse momentum components are induced by interposing transverse baffles into the venturi tailpipe so that the gaseous flow is forced to traverse a serpentine path as it moves vertically downward through the tailpipe. The serpentine flow path may also be induced by sloped baffle trays as well as by alternately arranged disc and doughnut plates. The serpentine flow path in each of these devices includes flow around a sharp edge such as that of the baffle or the edges of the disc and doughnut plates. Accordingly, the flow around these sharp edged devices induces turbulent eddies in the flow path which materially aid the mixing of the Stretford solution droplets with the gas stream passing through the device.

In another embodiment of the process improvement, the transverse momentum component is induced in the multiphase flow as a circumferential momentum component by use of a static mixer. The static mixer divides the flow into two or more portions, each portion being constrained to flow in a helical flow path. After a short axial distance, those portions are recombined, mixed, and divided again. The static mixer creates a high level of turbulent mixing between the various flow portions thereby enhancing the opportunity for gas/liquid contact as the multiphase flow passes vertically downward through the mixing section. Again, the increased turbulence materially improves the efficiency of the hydrogen sulfide removal by the gas/liquid contacting step.

Yet another embodiment of the Stretford process improvement includes the introduction of a portion of the Stretford solution downstream of the primary gas/liquid scrubber through additional transversely directed sprays. Introduction of these additional sprays also induces transverse momentum components into the fluid flow system which generate turbulence. In addition, these additional Stretford solution sprays deliver liquid directly to the core region of the flow for enhanced gas/liquid contact. And, this liquid redistribution provides a materially increased surface area of liquid across which the gas/liquid contact may occur.

BRIEF DESCRIPTION OF THE DRAWINGS

Many objects and advantages of the present invention will be apparent to those skilled in the art when this specification is read in conjunction with the attached drawings wherein like reference numerals have been applied to like elements and wherein:

FIG. 5 is a schematic illustration of a fifth embodiment of the improved Stretford process in accordance with the present invention; and FIG. 6 is a schematic illustration of a sixth embodiment of the improved Stretford process in accordance with the present invention.

DESCRIPTION OF THE PREFERRED EMBODIMENTS

Figure 1:
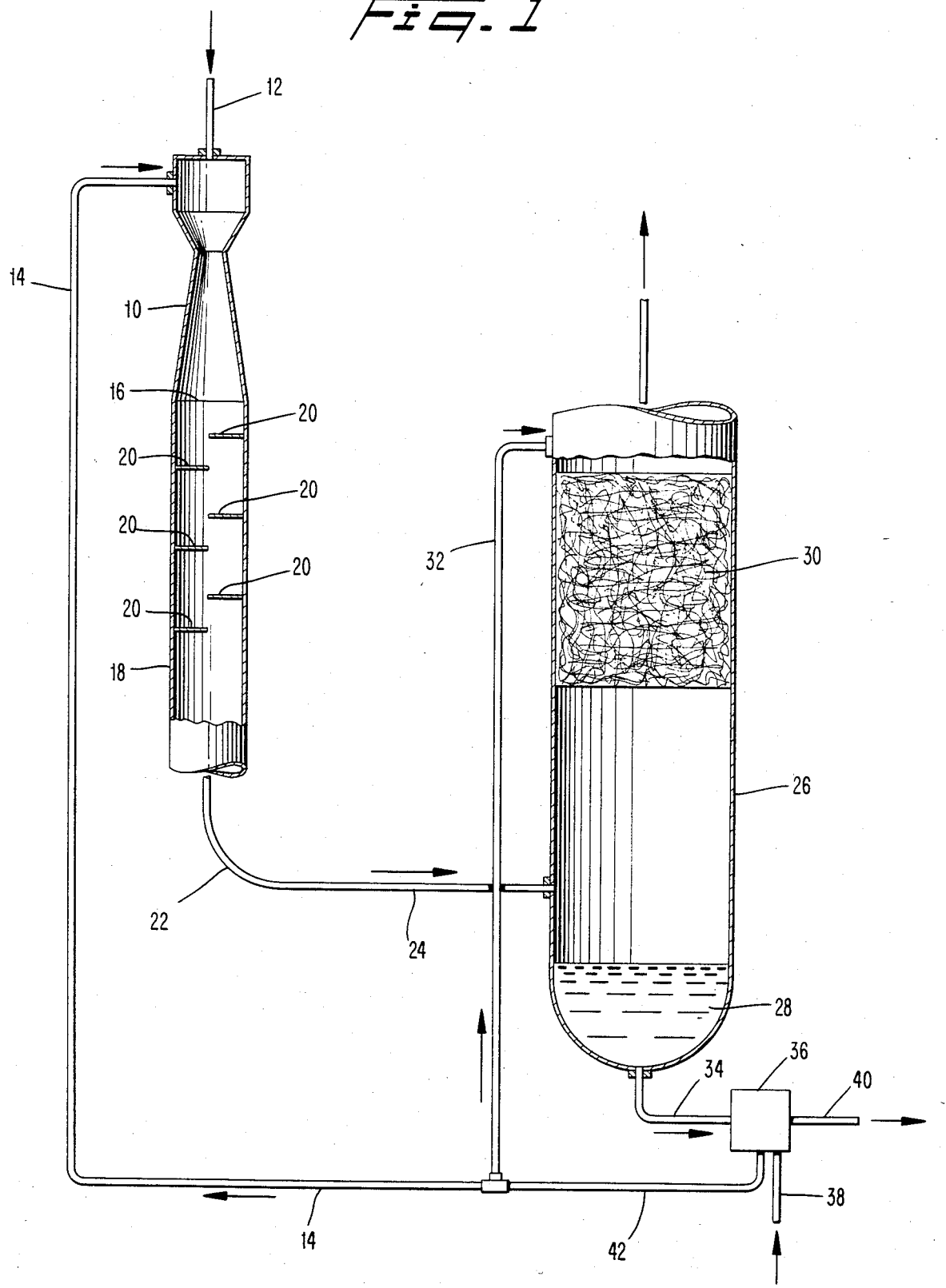
FIG. 1 is a schematic illustration of a first embodiment of the improved Stretford process in accordance with the present invention.

In the Stretford process, a predetermined volumetric flow of a gas having a hydrogen sulfide constituent is introduced to a scrubber 10 (FIG. 1) through an inlet conduit 12. If desired, the scrubber 10 may be a suitable conventional venturi-type gas liquid contacting device. Within the scrubber 10, a predetermined flow rate of a Stretford solution is introduced and brought into intimate contact with the gas. Preferably, the Stretford solution is sprayed into the venturi inlet in sufficient quantity and at sufficient velocity to induce the gas to flow through the venturi and the downstream system. In this manner, complexity and expense of additional blowers are avoided. The Stretford solution introduced through the conduit 14 is recirculated Stretford solution as will become more apparent hereinafter. The Stretford solution is a liquid having the constituents described above.

Within the scrubber 10 as the first gas/liquid contact occurs. Thus, the Stretford solution reacts with hydrogen sulfide constituent of the gas simultaneously reducing the Stretford solution and liberating elemental sulfur. A multiphase flow exists at the downstream end 16 of the scrubbing device which consists of the gaseous phase having at least some of the hydrogen sulfide constituent removed, the liquid phase, and, possibly, sulfur particles resulting from the reaction between the Stretford solution and the hydrogen sulfide gas. While it is not known with certainty how quickly the elemental sulfur forms, some elemental sulfur is recycled as the Stretford solution is recycled through the process. Elemental sulfur typically occurs in this process in the form of fine particles of sulfur or agglomerations of sulfur particles which may be carried along in the liquid phase of the fluid stream.

This multiphase flow then passes into a conduit 18 extending downstream from the scrubbing device 10. The Conduit 18 has an internal diameter which corresponds to the internal diameter at the exit 16 of the venturi. As a result, the conduit 18 does not cause perceptible acceleration or deceleration of the multiphase flow. In the portion of the conduit 18 adjacent to the scrubbing device 10, transverse fluid momentum components are induced in the multiphase flow to enhance gas/liquid contact.

As illustrated in FIG. 1, the transverse momentum components may be induced by an array of baffles 20 provided in the conduit 18. These baffles 20 are approximately semicircular, extend generally horizontally at intervals spaced axially along the centerline and project toward the centerline of the conduit 18. As the multiphase flow passes vertically downwardly through the conduit 18, the baffles 20 force the flow to traverse a serpentine path. That serpentine path increases the gas/liquid contact of the multiphase flow. Moreover, as the serpentine flow is forced to negotiate sharp bends in the conduit 18, some of the liquid and solid phase will be centrifugally separated from the flow and temporarily accumulate on the baffle plates 20.

As this liquid accumulates on the baffle plates, it drips off the edge creating a crossflow of liquid droplets through which the gaseous phase must pass. Thus, multiple additional stages of gas/liquid contact are provided by the crossflowing relationship between the gas and the liquid phases in the conduit 18. This additional gas liquid contact materially increases the hydrogen sulfide removal process which takes place in the Stretford process.

As the multiphase flow leaves the bottom end of the transverse momentum inducing devices in the conduit 18, it passes through an elbow 22 and enters a generally horizontal conduit portion 24. The horizontal conduit portion 24 exhausts into the bottom end of a suitable conventional absorbing column 26.

In the bottom of the absorbing column 26, the gas phase is separated from the liquid and solid phases of the multiphase flow. This separation is effected by reducing the velocity of the gaseous phase as it enters the large volume of the absorber column 26 and turning the gaseous phase to flow vertically upwardly. The linear momentum of the liquid and solid phases of the multiphase flow carries those phases tangentially forward so that a centrifugal separation occurs. Moreover, the liquid and solid phases are pulled downwardly by gravity into a pool 28 of Stretford solution which accumulates in the bottom of the absorbing column 26. As the gas flow moves vertically upwardly through the absorber column, a secondary flow of Stretford solution is introduced to the absorber media 30 from a conduit 32. The Stretford solution which contacts the gas phase in the absorber media 30 is intended to simply remove those last remaining portions of the hydrogen sulfide in the gas phase discharged from the conduit 18.

Stretford solution introduced into the absorbing media 30 from the conduit 32 falls vertically downwardly into the pool 28 of Stretford solution due to gravitational forces. Above the absorber column 26, the gas phase has been essentially cleansed of hydrogen sulfide constituent gas. In the pool 28, the sulfur particles from all gas/liquid contact steps accumulates, along with the reduced Stretford solution. The Stretford solution and entrained sulfur are withdrawn from the pool 28 in the bottom of the absorber column by means of a discharge conduit 34 which communicates with a solid-liquid separation device 36.

In the solid liquid separation device 36, which may be a conventional flotation cell, the Stretford solution along with the entrained sulfur particles are subjected to a stream of gas containing oxygen, such as air, which is introduced by means of a conduit 38. The oxygen reacts with the reduced Stretford solution and regenerates that solution to its oxidized state. Simultaneously, an additional separation benefit can be obtained in that the air bubbles can accumulate and agglomerate with the sulfur particles to thereby effect a flotation of the elemental sulfur particles to the top of the solid liquid separator 36.

Elemental sulfur which has been removed from the gas stream entering through the conduit 12 is withdrawn from the separator 36 by means of conduit 40. The elemental sulfur may then be washed, dried such as with filters and centrifuge and melted to create a useful sulfur product. The regenerated Stretford solution which flows from the solid-liquid separator 36 communicates via a conduit 42 with the conduits 14, 32. Those conduits 14, 32 supply the regenerated Stretford solution to the primary scrubber 10 as well as to the secondary scrubber which comprises the media of the absorbing column 26.

Figure 2:
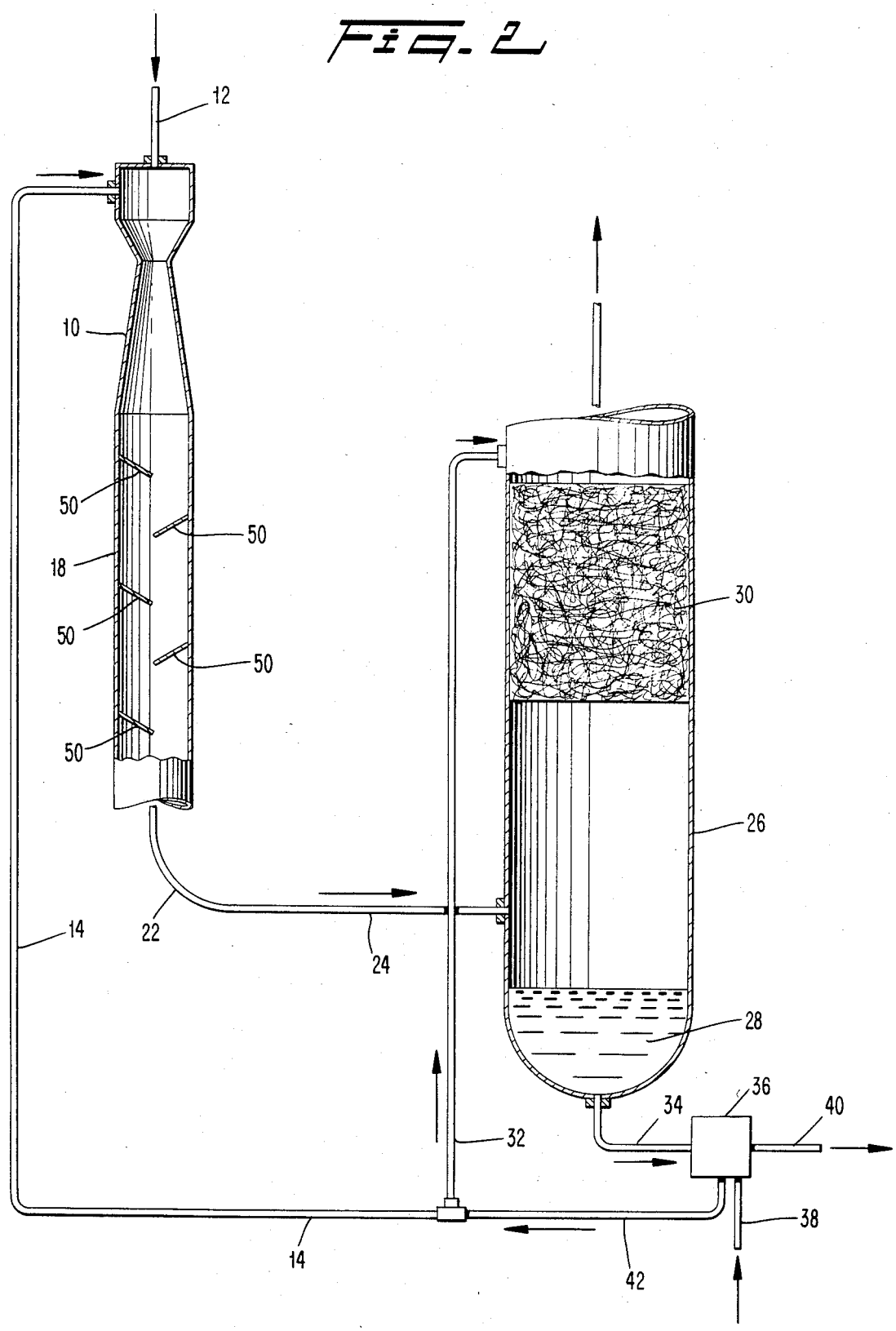
FIG. 2 is a schematic illustration of a second embodiment of the improved Stretford process in accordance with the present invention.

In the embodiment illustrated in FIG. 2, the horizontal baffle plates 20 have been replaced by inclined baffle plates 50. These inclined baffle plates 50 are semielliptical in plan, are sloped downwardly in the flow direction, extend to the vicinity of the conduit centerline and are spaced axially from one another along the conduit centerline. In all other respects, the embodiment of FIG. 2 is identical to the embodiment of FIG. 1. In operation, the embodiment of FIG. 2 uses the sloped baffle plates 50 to provide a cascading flow of the separated liquid Stretford solution that flows vertically downwardly traversing the conduit 18.

With these sloped baffles 50, the multiphase flow is also forced to traverse a serpentine path as it moves downwardly through the conduit 18. Moreover, the liquid phase is not permitted to stagnate at any vertical lever. In contradistinction, any liquid phase separated from the multiphase flow is allowed to freely cascade downward under the influence of gravity. Accordingly, a liquid sheet is provided between each pair of vertically spaced adjacent baffles 50. The flow of multiphase fluid must pass through each of these liquid sheets while moving vertically downward and traversing the serpentine path through the conduit 18.

The inclined baffle plates 50 thus divert the multiphase flow from side to side thereby inducing transverse momentum components. Moreover the cascading liquid phase further enhances gas/liquid contact, as noted above.

Figure 3:
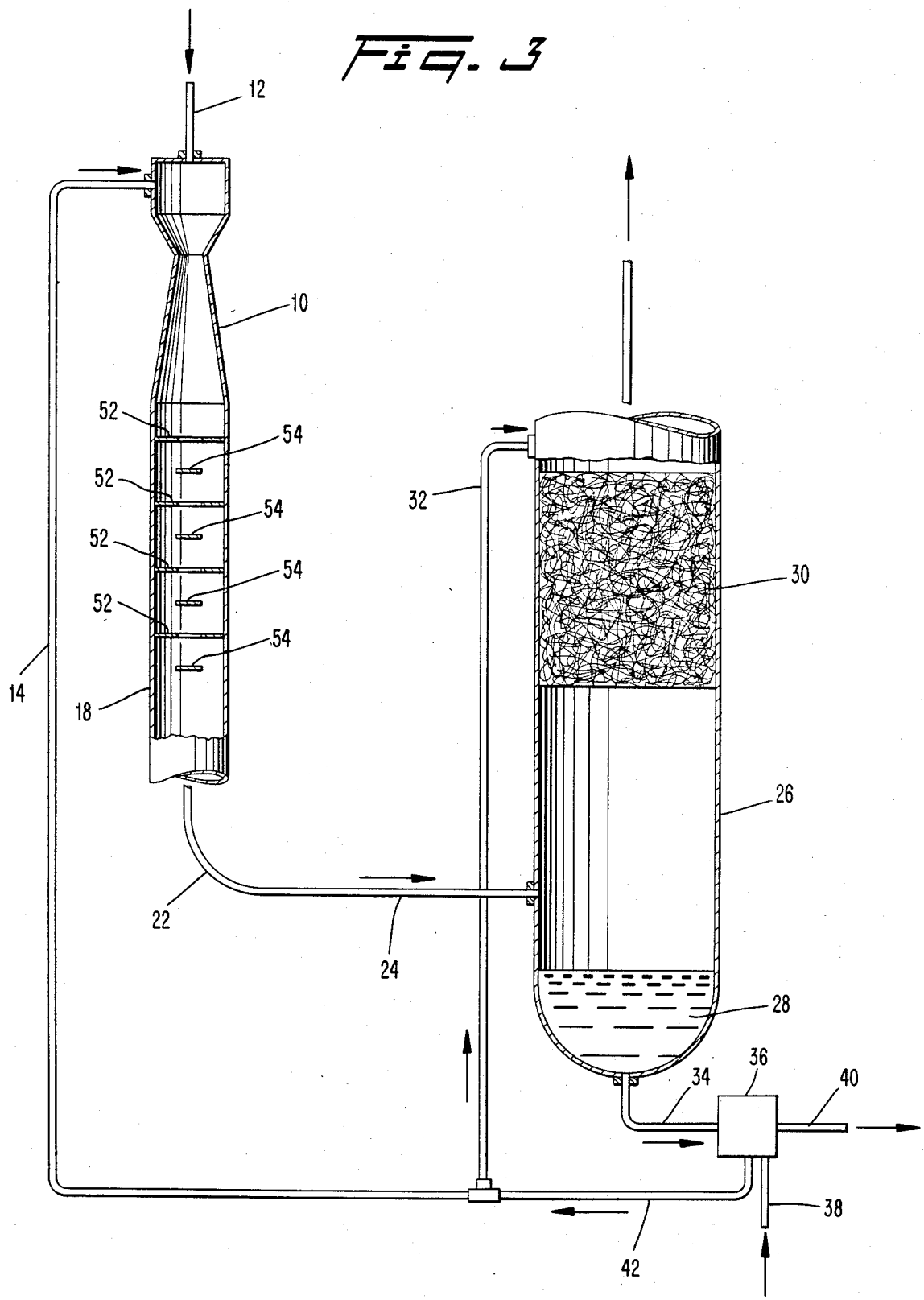
FIG. 3 is a schematic illustration of a third embodiment of the improved Stretford process in accordance with the present invention.

Turning now to FIG. 3, the conduit 18 may also be provided with a plurality of spaced apart discs 54 which are intercalated with a corresponding number of annularly-shaped doughnut plates 52. Axial spacing between the doughnut plates 52 is generally uniform. As the multiphase flow passes vertically downwardly through the conduit 18, the discs 54 and associated doughnuts 52 cause the multiphase flow to pulsate radially outward and inward, thereby creating a serpentine flow that traverses essentially one-half of the conduit diameter 18. Thus, the intercalated plates 52, 54 cause transverse radial momentum components to be induced in the flow stream. These momentum components reverse from plate to plate.

The liquid and solid phases at least partially separate from the multiphase flow due to centrifugal effects in negotiating the radial movements of the serpentine path. Thus, a quantity of Stretford solution is created which then cascades downward from doughnut to disc to doughnut to disc, etc., vertically downward through the conduit 18. The cascading flow between adjacent discs 54 and doughnut plates 52 creates a spray of Stretford solution flowing transversely to the multiphase flow and through which multiphase flow must pass. Accordingly, considerably enhanced efficiencies of gas/liquid contact are obtained in the embodiment of FIG. 3.

Figure 4:
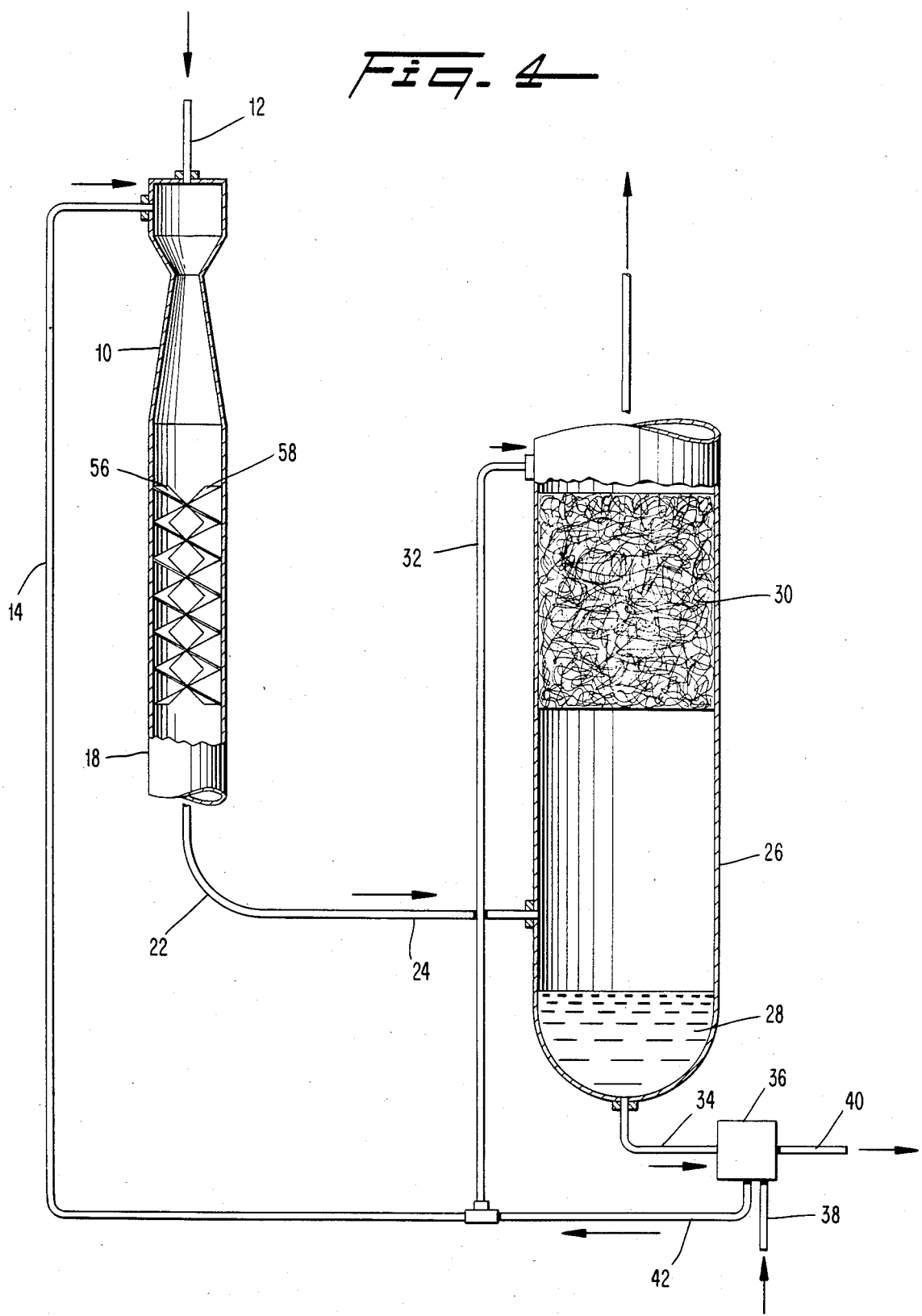
FIG. 4 is a schematic illustration of a fourth embodiment of the improved Stretford process in accordance with the present invention.

In the embodiment of FIG. 4, the transverse momentum component of the multiphase flow is induced by the use of, for example, helical blades 56, 58 disposed around the inner circumference of the conduit 18. Each blade 56, 58 is constructed to have an external diameter which corresponds to the internal diameter of the conduit 18. All vanes have the same helical pitch. When placed in the conduit 18, the vanes 56, 58 are interengaged such that corresponding portions are diametrically opposed and such that the blades cooperate to define helical channels. The helical members 56, 58, for example, thus constitute a static mixer.

The helical members 56, 58 serve to divide the multiphase flow leaving the scrubber 10 into portions which wind through the helical passages defined between the vanes 56, 58. Thus the vanes 56, 58 induce a transverse circumferentially directed momentum component in the flow. The vanes 56, 58 are discontinuous along the length of the static mixer so that the portions are recombined, mixed, and divided again several times within the length of the mixer. Thus, the helical vanes create a high degree of turbulence in the conduit section 18 and thereby promote a high degree of mixing between the annular portion and the cylindrical portion. This mixing enhances the gas/liquid contact and, consequently, materially improves the hydrogen sulfide removal efficiency upstream of the absorbing column.

Yet another embodiment of the improved Stretford process is illustrated in FIG. 5. In this embodiment, the conduit 14 supplying Stretford solution to the scrubber 10 is provided with a plurality of branch conduits 60, each of which is provided with a corresponding spray nozzle 62. The spray nozzles 62 are preferably arranged so as to be coaxially aligned and axially spaced along the longitudinal axis of the conduit 18. Moreover, each of the nozzles 62 sprays a portion of Stretford solution directly into contact with the multiphase flow leaving the scrubber 10.

Each centrally positioned nozzle 62 creates a generally hollow conical spray directed downward. This spray gives a radially outward directed momentum component, transverse to the multiphase flow, and through which the multiphase flow must pass while moving downwardly through the conduit 18. Thus, the radial component of the conical spray induces transverse momentum components in the flow. Moreover, the spray nozzles 62 with their conical spray pattern wet the inside surface of the conduit 18 thus causing a sheet of liquid to flow downwards along that surface. Accordingly, gas/liquid contact is enhanced further by increasing the exposure of hydrogen sulfide to the Stretford liquid.

In the final illustrated embodiment (see FIG. 6), branch conduits 60 from the conduit 14 are connected with a corresponding manifold of radially oriented spray nozzles 64. The manifolded spray nozzles 64 are directed radially with respect to the axis of the conduit 18. Moreover, the manifolded spray nozzles 64 are axially spaced along the conduit 18 so that portions of Stretford solution are introduced over an appreciable length of the conduit 18. When the flows of Stretford solution are exhausted through the manifolded nozzles 64, the Stretford solution has a radial momentum component, transverse to the direction of movement of the multiphase flow moving vertically downwardly through the conduit 18 from the scrubber 10. The radial component induces radial momentum components in the multiphase flow. The tertiary sprays do not increase the amount of Stretford solution used but do increase the surface area for gas/liquid contact because many more droplets with smaller size and, therefore, greater surface area, are introduced It will now be apparent that there has been provided in accordance with the present invention a new and improved Stretford process which overcomes problems of the type discussed above. In addition, it will be apparent to those skilled in the art that numerous modifications, variations, substitutions and equivalents exist for features of the invention which do not materially depart from the spirit and scope thereof. Accordingly, it is expressly intended that all such modifications, variations, substitutions and equivalents which fall within the spirit and scope of the appended claims be embraced thereby.

What is claimed is:

1. A Stretford process for removing hydrogen sulfide from a gas stream comprising the steps of:

flowing a gas stream containing a hydrogen sulfide constituent into a venturi scrubbing device; spraying a Stretford solution into cocurrent contact with the gas stream which reacts with the hydrogen sulfide constituent and generates elemental sulfur resulting in a multiphase fluid flow leaving the scrubbing device;

inducing in the multiphase fluid flow downstream of the scrubbing device fluid momentum components transverse to the direction of the multiphase fluid flow leaving the scrubbing device to enhance gas/liquid contact;

discharging the multiphase flow into an absorbing column;

separating both Stretford liquid and the solid phase from the gaseous phase by centrifugal action in the absorber column;

contacting the gaseous phase with additional Stretford solution that reacts with the hydrogen sulfide constituent in the absorber column in countercurrent relationship;

gravitationally separating the additional Stretford solution from the gaseous phase in the absorber column;

separating elemental sulfur from the liquid and regenerating the Stretford liquid with an oxygencontaining gas; and recirculating the regenerated Stretford liquid.

2. The process of claim 1 wherein the momentum inducing step includes passing the multiphase flow around members protruding into the path of the multiphase flow so that the multiphase flow traverses a serpentine flow path.

3. The process of claim 2 wherein the serpentine flow path is induced by baffle trays.

4. The process of claim 2 wherein the serpentine flow path is induced by sloped baffle trays.

5. The process of claim 2 wherein the serpentine flow path is induced by interdigitated disc and doughnut plates.

6. The process of claim 1 wherein the momentum inducing step includes passing a portion of the multiphase flow through a spiral flow path and a second portion of the multiphase flow through a generally cylindrical flow path, the spiral and cylindrical flow paths being in lateral fluid communication with one another.

7. The process of claim 6 wherein the multiphase flow is split into portions by a static mixer.

8. The process of claim 1 wherein the momentum inducing step includes spraying liquid into the multiphase flow so that a radially outwardly directed flow component is obtained.

9. The process of claim 1 wherein the momentum inducing step includes spraying liquid into the multiphase flow so that a radially inwardly directed flow component is obtained.

* * * * *